Patented Jan. 26, 1937

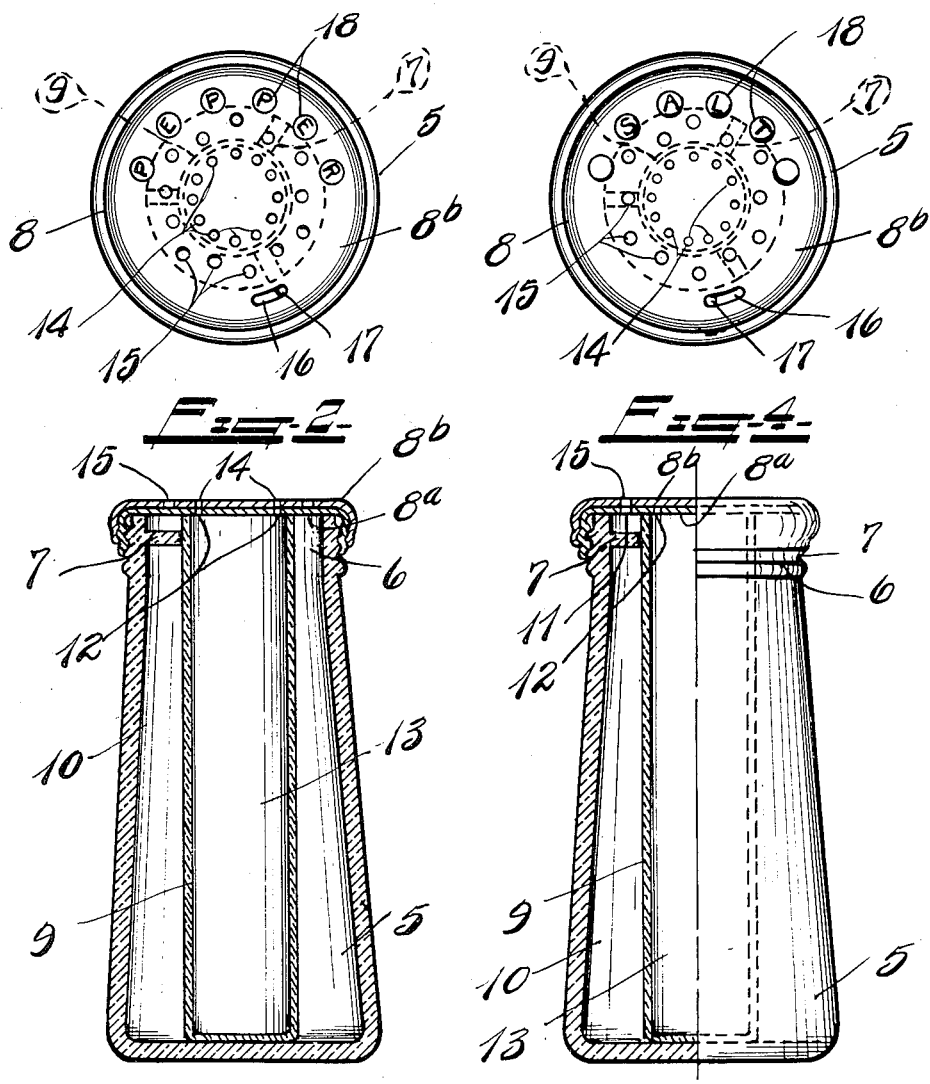

2,068,749

UNITED STATES PATENT OFFICE 2,068,749

COMBINATION SALT AND PEPPER SHAKER

John La Douce, Saginaw, Mich., assignor of one-half to Joseph W. Firstel, Saginaw, Mich.

Application May 10, 1935, Serial No. 20,781

1 Claim. (Cl. 65—45)

One of the prime objects of the invention is to design a combination salt and pepper shaker which is readily adjustable for dispensing either salt or pepper from an individual container.

Another object is to provide a simple, practical, and economical combination salt and pepper shaker which is economical to manufacture and assemble, and which can be readily filled when the salt and/or pepper supply is exhausted.

A still further object is to provide simple, convenient, and easily adjustable means for adjusting the cover to dispense the seasoning desired, as well as means visible to the user for indicating the adjustment.

With the above and other objects in view, the present invention consists in the combination and arrangement of parts, hereinafter more fully described, illustrated in the accompanying drawing, and more particularly pointed out in the appended claim, it being understood that changes may be made in the form, size, proportion, and minor details of construction, without departing from the spirit, or sacrificing any of the advantages of the invention.

In the drawing—

Fig. 1 is a vertical sectional view through the combination shaker, and showing it set for dispensing pepper.

Fig. 2 is a top plan view taken normal to Fig. 1.

Fig. 3 is a part sectional side view showing the shaker set for dispensing salt.

Fig. 4 is a top plan view taken normal to Fig. 3.

The present invention is designed to accommodate and dispense both salt and pepper, or any other two seasoning products desired from a single container, and thus obviate the necessity of having individual salt and pepper shakers.

Referring now more specifically to the drawing in which I have shown the preferred embodiment of my invention, the numeral 5 indicates the container which is preferably formed of glass, although it will be understood that it can be formed of any other desired material adaptable to contain products of this nature, without corrosive or other detrimental results.

This container can be of any size, shape, and/or design, the upper end or neck portion 6 being threaded as shown to receive an internally threaded cover member 8 which is formed in two parts or sections, and inwardly projecting lugs 7 are provided adjacent the upper end of the neck.

The container provides for individual compartments, and includes a centrally disposed, preferably glass, tubular shell 9 which is mounted in the container 5. This shell is centered by the lugs 7 and is of a length so that the upper end bears against the inner face of the cover when the shaker is assembled, thereby securely holding the shell in position and preventing mixing of the products. Pepper is introduced into this inner shell 9 when the cover is removed, and salt is provided in the compartment 10 which surrounds said shell, so that each product can be dispensed when the cover is properly adjusted.

The cover 8 is formed in two parts or sections, the inner section 8a having a plurality of spaced apart openings 11 which are of the proper size to dispense salt when desired, these openings communicating with the salt compartment 10 of the shaker.

A plurality of relatively smaller openings 12 are provided near the center of the inner section 8a, and these openings communicate with the pepper compartment 13, these openings 12 being opened and closed in a manner to be presently described.

The cover section 8b is positioned over the section 8a, and is also provided with openings through which the salt and pepper is dispensed, this section being rotatable to bring certain groups of openings into alignment, and when in position as shown in Figs. 1 and 2 of the drawing, the openings 14 in the section 8b register with the openings 12 provided in the section 8a, while the openings 11 are closed, and when the cover is turned to position as shown in Figs. 2 and 3 of the drawing, the openings 15 provided in the section 8b will be in alignment and register with the openings 11 provided in the section 8a and communicate with the salt compartment 10, while the openings 12 will be closed.

A concentric slot 16 is provided in the cover 8, and a pin 17 is provided in the inner section 8a thereof, this pin projecting into said slot and limiting the rotation of the member 8b with relation to the member 8a. A plurality of larger openings 18 are provided in the member 8b, and suitable indicia is provided on the face of the section 8a to indicate the product being dispensed; for instance, when the cover is in position shown in Figs. 1 and 2, the word "pepper" will be visible through the openings 18, and the user then knows that pepper can be dispensed, then by a slight rotation of the cover to position as shown in Fig. 4, the word "salt" is visible, so that the user knows that salt can be dispensed. There is no guessing—the proper openings always register when the pin 17 is at the end of the slot 16.

The compartments can be readily filled when empty, and if desired, a small gasket (not shown)

can be provided on the upper rim of the shell 9 so that a tight seal is provided.

From the foregoing description it will be obvious that I have perfected a very simple, practical, and convenient combination salt and pepper shaker for use in hotels, homes, or in any place where it is desired to season food or other products.

What I claim is:

A combination salt and pepper shaker comprising a hollow receptacle formed with a threaded end portion, a centrally disposed receptacle mounted therein and forming an individual inner compartment, inwardly projecting lugs adjacent the upper end of the hollow receptacle for centering said centrally disposed receptacle, a sectional cover threaded on the outer receptacle forming a closure for said compartments, groups of openings formed in the inner cover section and communicating with the respective compartments, indicia provided on said inner section, and an outer cover section mounted for limited rotation on the inner section, and provided with a concentric slot therein, a pin on the inner cover section and projecting into said slot, companion groups of openings formed on the outer cover section and adapted in one position to register with one set of openings in the inner section, while closing the remaining openings therein, and openings in the outer shell for displaying said indicia to indicate the setting of said outer section.

JOHN LA DOUCE.